United States Patent Office
3,443,389
Patented May 13, 1969

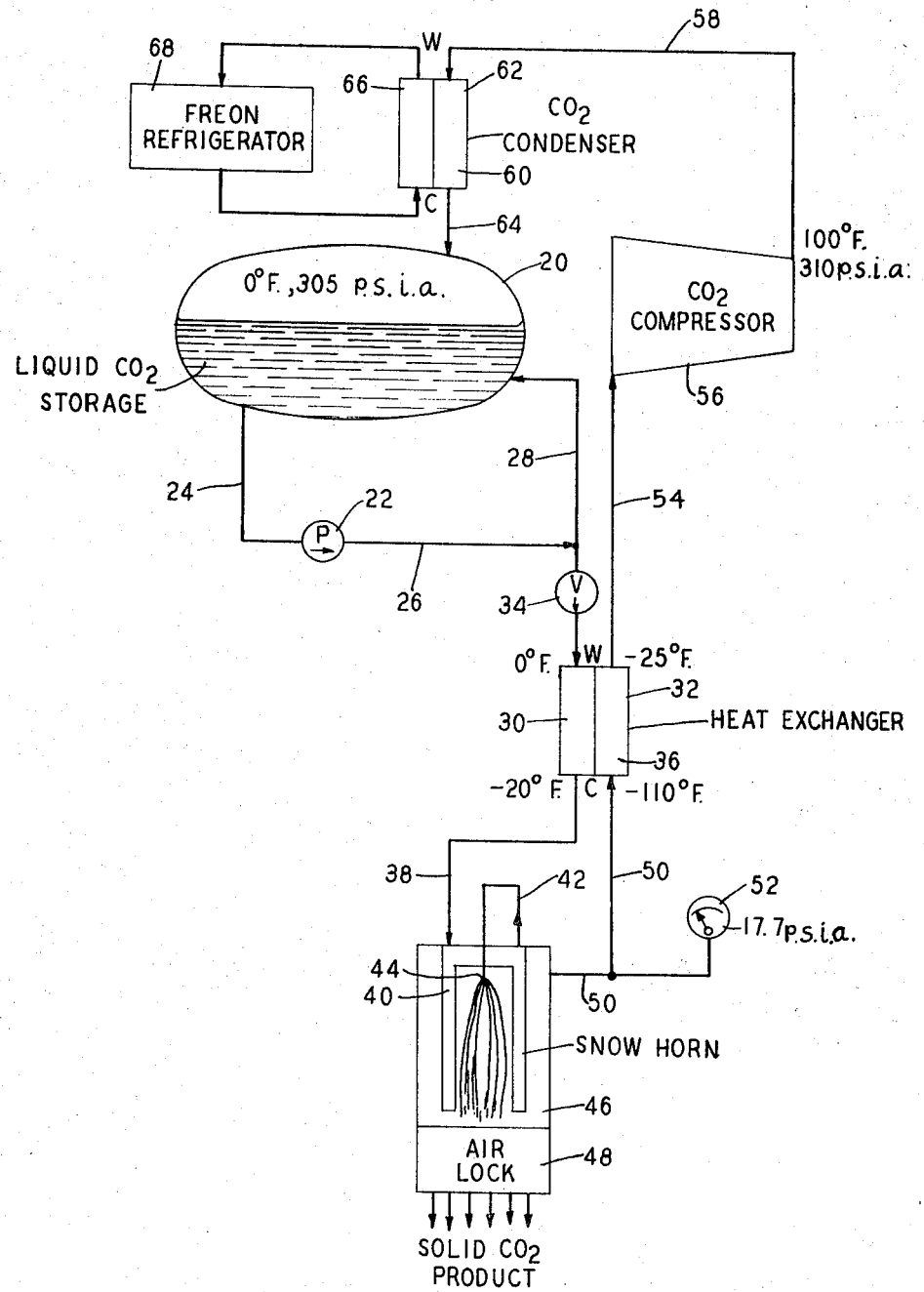

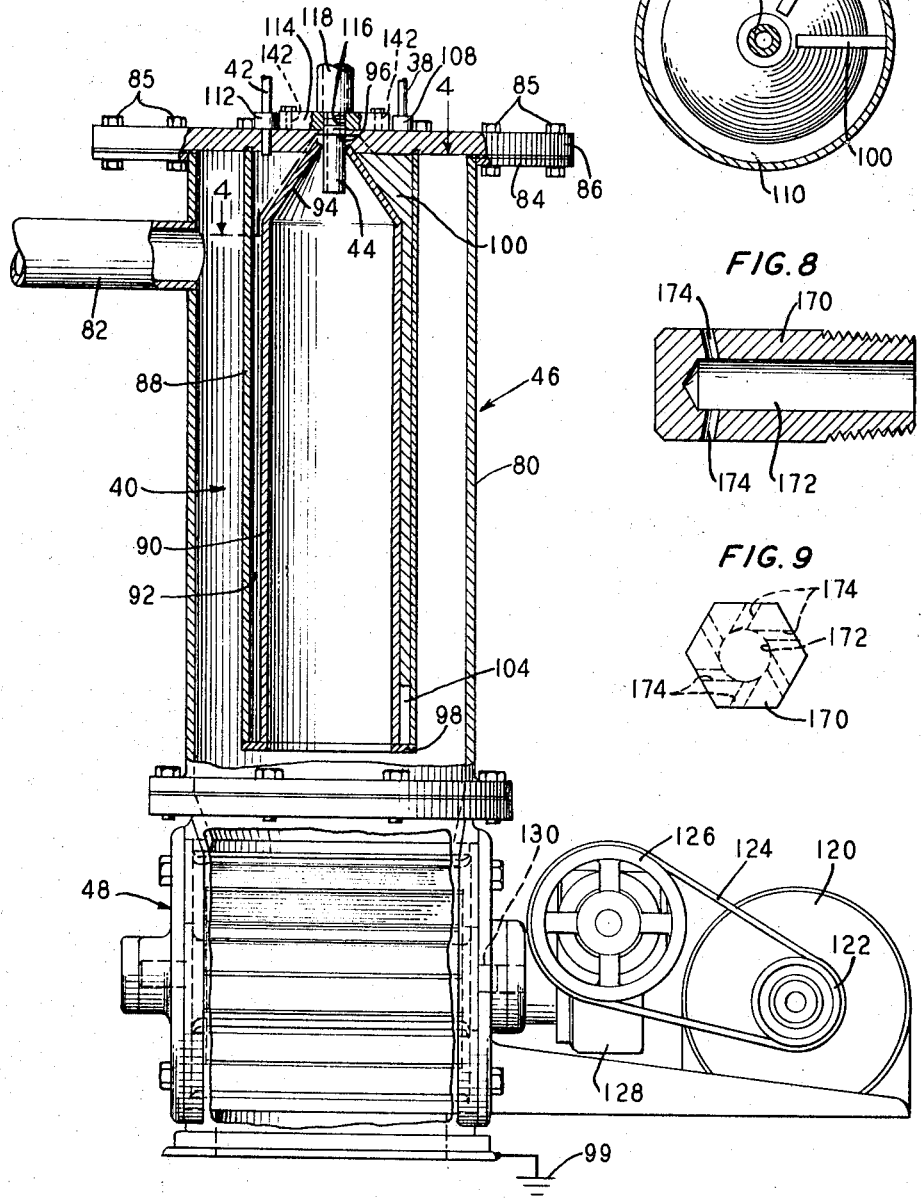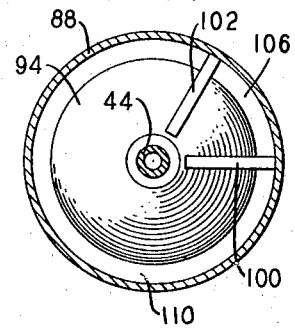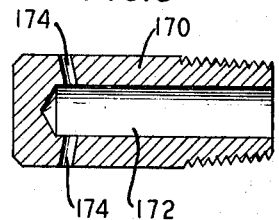

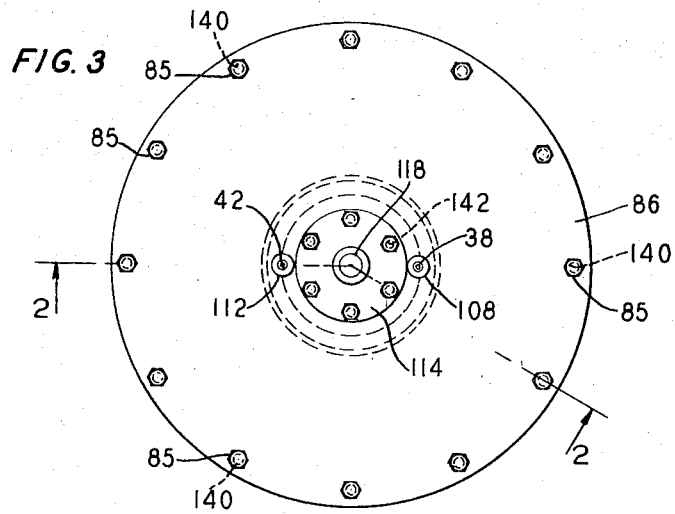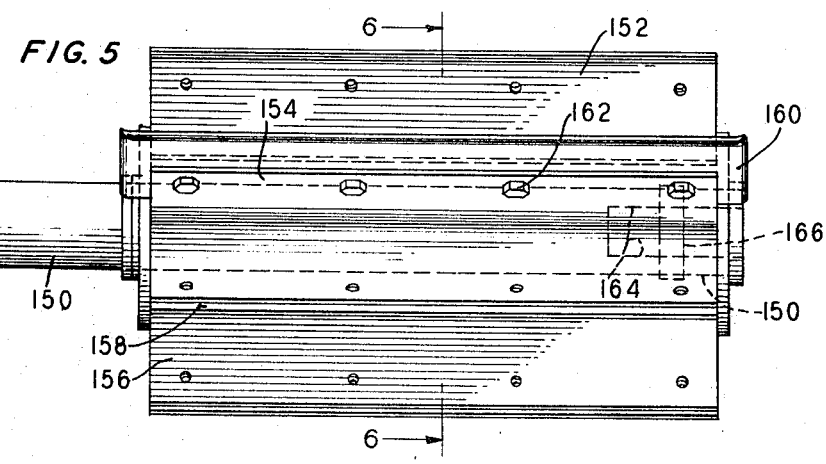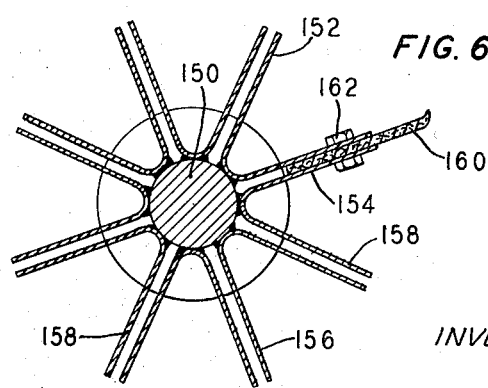

3,443,389
APPARATUS FOR THE PRODUCTION OF
CARBON DIOXIDE SNOW
Palmer W. Townsend, Berkeley Heights, William B. Laird, Murray Hill, and Albert Halfon, South Somerville, N.J., assignors to Air Reduction Company, Incorporated, New York, N.Y., a corporation of New York
Filed Dec. 27, 1966, Ser. No. 604,826
Int. Cl. F25j 1/02
U.S. Cl. 62—35                                6 Claims

ABSTRACT OF THE DISCLOSURE

Liquid carbon dioxide is forced through the hollow portion between the walls of a double walled snow horn and then through a conduit exiting the snow horn into a nozzle which is mounted in one end of the snow horn, the snow horn being included in a snow receiving vessel. The vessel includes a rotary valve which is positioned so that the snow horn directs snow from the nozzle into the rotary valve, the valve including a plurality of compartments.

---

This invention relates to a continuous process for converting liquefied carbon dioxide into a loose mass of small solid particles, commonly called carbon dioxide snow, with substantially complete recovery of accompanying carbon dioxide gas for reliquefication and return to the liquid supply.

An object of the invention is to render the process of forming solid carbon dioxide, in the form commonly called $CO_2$ snow, truly continuous, as contrasted with processes which form the snow in batches and deliver the snow intermittently, with or without compression into blocks, while at the same time recovering and returning from recondensing a major portion of the revert gas which is formed during the process.

Another object is to substantially prevent clogging of the apparatus due to snow sticking to surfaces of the enclosure in which the snow is formed.

Another object is to produce $CO_2$ snow as a product, efficiently and economically.

A feature of the invention is the use of an air lock for withdrawing product $CO_2$ snow from the process while retaining and returning for reliquefication the major portion of the revert gas.

Another feature is a system of baffles in a liquid jacket surrounding the snow forming nozzle and snow stream, to ensure substantially uniform distribution of relatively warm liquid in a thin film for warming the surfaces of the jacket, thereby effectively reducing or preventing any sticking of snow to the jacket or to the walls of a vessel enclosing the snow stream.

Another feature is the use of electrically conductive material for all parts of the apparatus that are in position to collect electrical charges, and electrically grounding all such parts to drain off such charges, in order to prevent these parts from attracting and holding particles of solid matter which would finally clog the apparatus.

In accordance with the invention, liquid carbon dioxide is kept under high pressure in circulating storage from which liquid is withdrawn and precooled by indirect heat exchange with revert gases, in a heat exchanger separate and removed from the snow horn. The snow horn is in an enclosure which is maintained at a pressure slightly above atmospheric. The nozzle is located at the top of the snow horn, which latter is in the form of a liquid jacket in which is maintained a thin film of liquid $CO_2$, on the way to the nozzle, to warm the jacket sufficiently to substantially prevent adherence of snow thereto. The jacket is open at the bottom so that the snow may enter freely into the inlet of the air lock. The air lock has vanes that are rotated continuously within a cylindrical housing, thereby passing the snow substantially continuously from top to bottom and delivering the snow by gravity as a loosely compacted solid $CO_2$ product. The product can be used as delivered, for purposes of freezing or refrigeration, or, if desired, it can be compacted into blocks without any interference with the process carried on in the snow horn and air lock.

The revert gases, warmed by indirect heat exchange with the liquid being subcooled, are then compressed and thereafter condensed in a heat exchanger by indirect heat exchange with a refrigerating stream provided by suitable means such as a Freon refrigerator.

Other features, objects and advantages will appear from the following more detailed description of an illustrative embodiment of the invention, which will now be given in conjunction with the accompanying drawings.

In the drawings,

FIG. 1 is a combined schematic diagram and flow sheet of a carbon dioxide snow making unit employing the invention;

FIG. 2 is a vertical elevational view, partly sectioned and partly broken away, showing a snow horn and an air lock which appear as component parts in FIG. 1;

FIG. 3 is a plan view of the head member of the snow horn of FIG. 2;

FIG. 4 is a plan view of the outer wall and of the truncated conical top portion of the inner wall of the snow horn, together with baffles, as viewed along line 4—4 in FIG. 2;

FIG. 5 is a side elevational view of the rotor of the air lock shown in FIG. 2;

FIG. 6 is a cross sectional view, as viewed along line 6—6 in FIG. 5, of the rotor that appears in elevation in FIG. 5;

FIG. 8 is a cross sectional view of a nozzle that is represented schematically in FIG. 2; and FIG. 9 is an end view of the nozzle of FIG. 8.

Figure 7:
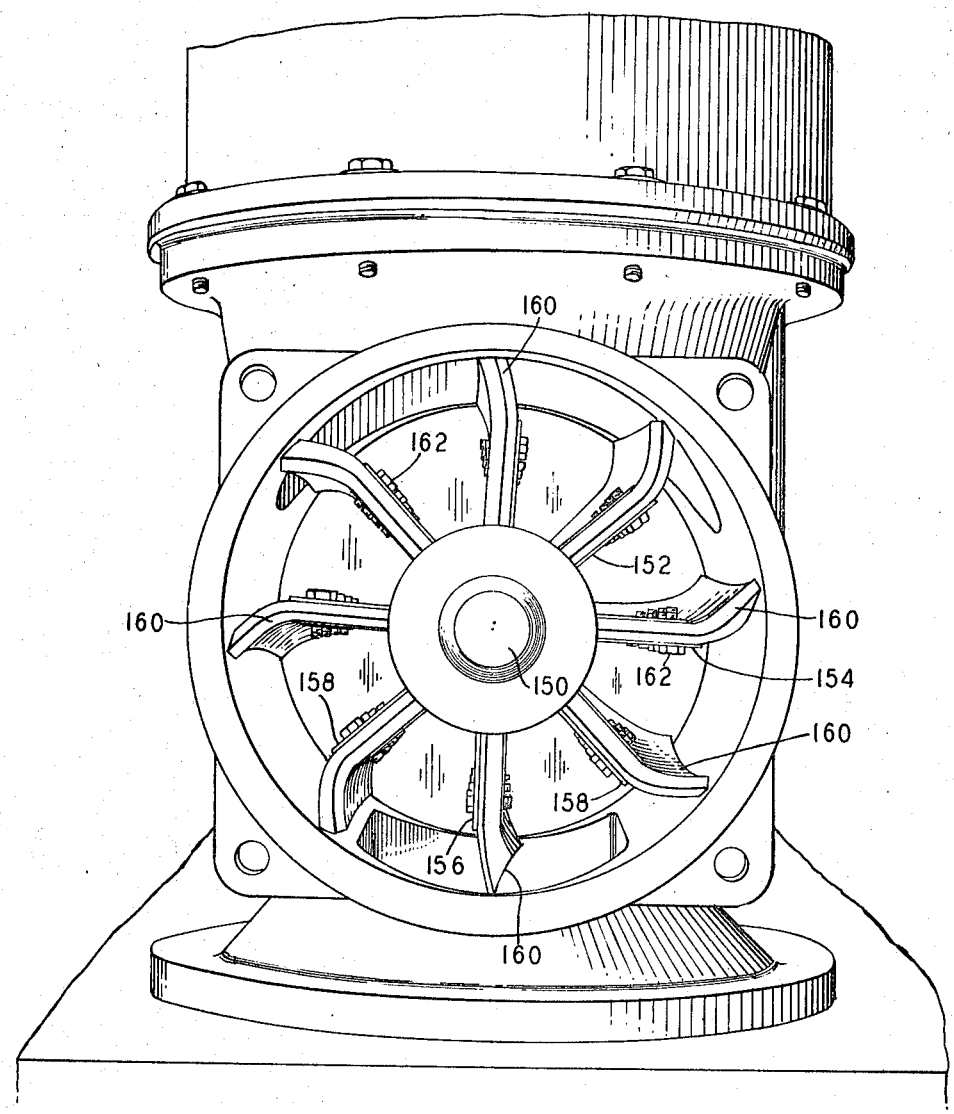
FIG. 7 is a perspective view of the air lock shown in FIG. 2, with a cover plate removed.

FIG. 1 shows a vessel 20 in which is stored liquid carbon dioxide under pressure of, for example, 305 p.s.i.a. A pump 22 is provided for continuously circulating the liquid carbon dioxide around a closed loop comprising conduits 24, 26 and 28. Liquid from the loop is admitted to a cooling pass 30 of a heat exchanger 32, under control of a valve 34. In the heat exchanger 32, the liquid in pass 30 is subcooled by revert gases in a heating pass 36. The subcooled liquid goes through a conduit 38 to a liquid jacket 40 wherein the liquid forms a thin flowing film upon the walls of the jacket. From the jacket, the liquid passes through a conduit 42 to a nozzle 44 through which the liquid is expanded into the snow horn which is constituted by the jacket 40, emerging in a high velocity stream as a mixture of solid particles, commonly called $CO_2$ snow, and gaseous carbon dioxide. The snow is impelled through the space enclosed by the jacket (snow horn) 40 and thence to the bottom of an outer enclosure 46 and into the air lock (rotary valve means) 48. The gaseous material builds up pressure against the airlock, disengages from the solid material and flows out of the vessel 46 through an outlet conduit 50 located near the top of the vessel. The airlock 48 serves to withdraw the solid material from the apparatus and to maintain the gas pressure slightly above atmospheric, for example, about 17.7 p.s.i.a., which pressure may be indicated by a pressure gauge 52. The main path of the gas is around the bottom of the jacket 40 and upward in the space surrounding the jacket to the conduit 50. Inasmuch as the vessel 46 is not open to the atmosphere, but is effectively closed off by the air lock 48, conditions are provided that are conducive to minimizing escape of revert gas to the atmosphere.

The conduit 50 conveys the revert gases to the heating pass 36 wherein the revert gases in being heated serve to subcool the liquid in cooling pass 30. A conduit 54 conveys the warmed gases to a compressor 56 which compresses the gas to a pressure slightly above the pressure in the storage tank 20, for example, about 310 p.s.i.a. A conduit 58 conveys the compressed gas to a cooling pass 60 of a condenser 62 wherein the gas is condensed to liquid and is delivered by way of a conduit 64 to the storage tank 20 above the liquid level in the tank. The condenser 62 is cooled by a Freon stream in a warming pass 66, supplied from a Freon refrigerator 68.

The heat exchanger 32 has two important effects. One is to improve the thermal efficiency of the system by precooling the liquid carbon dioxide on the way to the nozzle 44. Another is to stabilize the process of transforming the liquid into solid at the nozzle, producing a steady stream of solid particles, substantially free from fluctuations, and smoothly controllable by means of the valve 34.

Referring now to FIG. 2, the shell of the vessel 46 is shown at 80, with side tube 82 for connection to conduit 50. The shell 80 is fastened, as by soldering, to a ring 84, which in turn is fastened as by bolts 85 to a head member 86. Centrally attached to the head member 86 is the outer wall 88 of the fluid jacket 40. The inner wall 90 of the fluid jacket is separated by a small clearance space 92 from the outer wall 88. The upper portion 94 of the inner wall 90 is a truncated conical member fastened into a central hole 96 in the head member 86. At the bottom, the clearance space 92 is closed off by a ring 98 that is fastened to both walls 88 and 90.

Two vertical baffles or fins 100 (FIGS. 2 and 4) and 102 (FIG. 4) subdivide the clearance space 92 extending downwardly from the head member 86 and terminating short of the ring 98 to leave a passage 104 that extends around the entire circumference of the space 92. The baffles 100 and 102 are not equally spaced around the circumference of the space 92, preferably dividing the space into an input passage 106 occupying about 60 degrees of the circumference and a output passage 110 occupying the remainder of the circumference. The input passage and the output passage are interconnected by way of the passage 104.

The liquid inlet conduit 38 communicates with the input passage 106 through a coupling 108 in the head member 86, and the outlet conduit 42 communicates with the output passage 110 through a coupling 112. A mounting plate 114 having a central threaded opening 116 is mounted upon the head member 86 concentrically with the hole 96. The nozzle 44 is threadedly attached to the plate 114 and a tube 118 communicates with the nozzle 44 for attachment to the conduit 42 at the end thereof remote from the coupling 112.

The air lock 48 is preferably a device with rotary vanes operable in a right cylindrical cavity in a housing block. We prefer to provide the rotary vanes with replaceable blades of such material that, at the working temperature of about −110° F., the blades do not tend to stick to the surfaces of the housing block or to accumulate a coating of snow or wear excessively. The air lock vanes rotate about a horizontal axis. The bottom of the shell 80 is preferably made of the same inside diameter as the inlet of the air lock so that the snow passes freely into the hopper of the air lock. The bottom of the air lock has an opening to permit the snow to fall out from between the vanes when the air lock is rotated. The air lock is rotated by means of an electric motor 120 which drives a pulley 122 which through a belt 124 drives a pulley 126, connected to a speed reduction gear box 128 connected in turn to the shaft of the air lock. The snow is carried down by the vanes of the air lock while the revert gases are effectively held back by the air lock and develop sufficient pressure to pass out through the tube 82 to the conduit 50.

The size of the wiper blades in the air lock is an important factor in obtaining a good seal against the escape of gas through the air lock. To obtain a good wiping action of the blades against the sides and ends of the chamber in which the blades revolve, the blades are made somewhat over size so that the edges of the blades will curl and rub against the adjacent walls. If the blade is too small, it will not curl properly and leakage of gas is excessive. If the blade is too large the seal is again less perfect. The slightly over size blades are self-cleaning because as the blade rubs over the rotor housing and comes to the edge of the bottom opening, a whipping action of the blade occurs which serves to dislodge the snow from the cavity between blades, dropping it through the bottom opening.

FIG. 7 illustrates the curling of the blades against the cylindrical side wall of the rotor housing and the partially straightened out condition of the blades when they extend into the top and bottom openings. The whipping action takes place when a blade snaps away from the cylindrical wall into the bottom opening.

FIG. 2 further illustrates the curling of the ends of the wiper blades against the end walls of the rotor housing.

Suitable materials for the replaceable wiper blades are polyethylene, leather, Corfam, etc., which are flexible at temperatures in the neighborhood of −110° F. and have a sufficiently long useful life at such temperatures.

FIG. 3 shows the top plan view of the head member 86, with plate 114 attached, showing the locations of holes 140 for bolts 85 to connect the head member 86 to the ring 84, and of holes 142 for studs to connect the plate 114 to the head member 86. The positions are shown for the couplings 108 and 112. Also, there is shown the section line 2—2 along which the view of the snow horn in FIG. 2 is taken.

FIG. 4 shows the top plan view of the truncated conical member 94 with the radial spacing of the baffles 100 and 102 indicated, together with a cross sectional view of the outer wall 88 of the liquid jacket 40. This view shows the division of the interior of the liquid jacket into an inlet passage 106 and an outlet passage 110, with the passage 106 extending around about 60 degrees of the circumference and the passage 110 extending around the remainder of the circumference.

FIGS. 5 and 6 show details of the rotor of an air lock that has been successfully employed in practicing the invention. An axle 150 has attached thereto a plurality of radial fin members 152, 154, 156, which extend along the major portion of the length of the axle. Each member 152, etc., may conveniently be of V-shaped cross section as shown in FIG. 6, fastened to the axle along the central portion of the V. A total of eight such fin members are shown, though any suitable number can be provided. Spaces 158 between substantially parallel portions of adjacent fins are adapted to hold blades or flaps, of which one is shown at 160 in FIG. 6. The flaps are preferably flat strips of suitable material bolted to the fins as illustrated by bolt 162.

The right end of the axle 150, as viewed in FIG. 5, is bored axially as at 164 to fit over a stud shaft 130 which extends outwardly from the housing of the gear box 128. Crosswise of the bore 164 is a pin 166 which fits into a crosswise slot in the stud shaft to effect a driving connection between the stud shaft and the rotor. The left hand end portion of the axle 150 extends outwardly from the rotor and fits into a thrust bearing in an end plate, which latter retains the rotor in driving relation.

The flaps 160 are readily replaceable, and the rotor is removable from the casing of the air lock for replacement of the flaps when necessary.

The parts of the snow horn, shell and airlock, except for the replaceable blades, which are in position to collect electrical charges and so attract and hold particles of solid material in their proximity, are preferably made of metal and electrically grounded to drain off such charges. To further this purpose, the inner wall 90 and outer wall 88 of the snow horn are preferably soldered or otherwise conductively connected to the head member 86, and the ring 98 is similarly connected to the walls 88 and 90. The shell 80 is preferably soldered to the ring 84 and the latter is electrically connected to the head member 86 by bolts 85. The shell 80 is soldered or otherwise electrically connected to a metallic portion of the airlock 48. An electrical ground connection is shown at 99 connected to the airlock to complete an electrical ground of the entire electrically interconnected structure comprising snow horn, shell and airlock.

FIGS. 8 and 9 show a preferred form of the nozzle 44. A bar 170 preferably hexagonal, with one end cylindrical, is exteriorly threaded at the cylindrical end and is centrally bored from the same end to form a cavity 172 extending nearly to the other end. Tangential bores 174 intersect the central bore near the closed end of the central bore to direct liquid into the snow horn. The tangential bores 174 preferably slant somewhat toward the closed end of the nozzle. Each bore 174 opens out from the nozzle on one of the faces of the outer surface of the nozzle.

The stream of snow and gas expelled at high velocity through the bores 174 impinges on the inner side of wall 90 of the snow horn with a downward velocity component imparted by the angle of the bores 174. The snow moves downwardly, partly by gravity and partly as a result of the flow velocity.

The table shows values of material flow, temperature and pressure at significant points in an illustrative system which has been successfully operated.

TABLE

| Reference numeral of system component | Phase | Flow, pounds per hour | Temperature, °F. | Pressure, p.s.i.a. |
|---|---|---|---|---|
| 26 | Liquid | 2,040 | 0 | 305 |
| 28 | do | 1,020 | 0 | 305 |
| 34 | do | 1,020 | 0 | 305 |
| 38 | do | 1,020 | −20 | 305 |
| 48 | Solid | 500 | −110 | 14.7 |
| 48 | Gas | 75 | −110 | 14.7 |
| 50 | Gas | 445 | −110 | 17.7 |
| 54 | Gas | 445 | −25 | 17.0 |
| 58 | Gas | 445 | 100 | 310 |
| 64 | Liquid | 445 | 0 | 305 |

The table indicates that the product $CO_2$ snow accounts for 49 percent of the liquid delivered to the nozzle 44 in the snow horn, and that the loss of gas through the air lock is held to 17 percent. Otherwise stated, the recovery of revert gas is 83 percent.

The apparatus permits considerable flexibility in operation and in the location of component parts. For example, the snow forming equipment comprising the snow horn, air lock, etc., may be located at a distance from the compressor, condenser, and heat exchanger, the liquid and gas lines running between the two locations. Also, a single compressor and condenser in a central location may serve a number of snow forming units at different locations, and the snow forming units may be designed for different capacities.

The snow forming unit may be located at the point of use of the product, thereby saving the need for transporting the product from place to place, or, alternatively, the product can be made at one place and transported to the point of use.

While illustrative forms of apparatus and methods in accordance with the invention have been described and shown herein, it will be understood that numerous changes may be made without departing from the general principles and scope of the invention.

We claim:

1. Apparatus for the continuous production of carbon dioxide snow comprising a snow receiving vessel, a double walled snow horn having a hollow portion between said walls mounted in said vessel, a nozzle mounted in one end of said horn, conduit means connecting said hollow portion and said nozzle, means to force liquid carbon dioxide into said hollow portion and through said nozzle, conduit means connected to said vessel to remove gas therefrom, rotary valve means in said vessel positioned so that the said horn directs snow into said valve means, said valve means comprising a plurality of blades defining a plurality of compartments for continuously discharging snow from said vessel.

2. Apparatus according to claim 1 in which the blades terminate in flexible flaps.

3. Apparatus according to claim 2 in which flaps are oversize so as to curl against the valve casing of the valve means to improve the resultant seal against escape of gas through the rotary valve means.

4. Apparatus according to claim 3 in which the rotary valve means has an outlet opening sufficiently large to permit each of said flaps at least partially to uncurl and to impart a whipping action to the flap as the flap enters said opening, whereby snow is dislodged from said flaps.

5. In apparatus for the continuous production of carbon dioxide snow, a snow receiving vessel comprising an outer shell, a double-walled open-ended inner snow horn comprising inner and outer coaxial cylindrical walls defining therebetween a space for accommodating a thin film of liquid, said space being divided radially by baffles into two intercommunicating portions, means to introduce liquid into one portion and exhaust it from the other portion, said exhaust portion having an arc approximately five times the arc of the inlet portion measured on the circumference.

6. In apparatus according to claim 5, rotary valve means positioned to receive snow discharged from said snow horn.

References Cited

UNITED STATES PATENTS

| 1,920,124 | 7/1933 | Gillis | 431—243 |
| 1,974,478 | 9/1934 | Weber | 62—35 |
| 1,976,777 | 10/1934 | Goosmann | 62—35 |
| 2,100,151 | 11/1937 | Tietz | 62—347 XR |
| 3,035,633 | 5/1962 | Palko | 431—243 |

FOREIGN PATENTS

| 304,958 | 1/1929 | Great Britain. |
| 423,290 | 1/1935 | Great Britain. |
| 477,587 | 12/1937 | Great Britain. |
| 514,037 | 10/1921 | France. |
| 642,057 | 8/1928 | France. |
| 643,119 | 3/1937 | Germany. |
| 890,062 | 9/1959 | Great Britain. |
| 932,559 | 7/1963 | Great Britain. |

NORMAN YUDKOFF, *Primary Examiner.*

V. W. PRETKA, *Assistant Examiner.*

U.S. Cl. X.R.

62—10, 26, 347